United States Patent [19]
Mansson

[11] 3,798,538
[45] Mar. 19, 1974

[54] PULSE EDDY CURRENT TESTING APPARATUS WITH RAMP PHASE SHIFTER

[75] Inventor: Sven E. Mansson, Hollviksnas, Sweden

[73] Assignee: Magnetic Analysis Corporation, Mt. Vernon, N.Y.

[22] Filed: Feb. 22, 1973

[21] Appl. No.: 334,960

[52] U.S. Cl. ................................................. 324/40
[51] Int. Cl. ............................................ G01v 33/12
[58] Field of Search ................................ 324/37, 40

[56] References Cited
UNITED STATES PATENTS
3,391,336  7/1968  Hentschel ............................. 324/37

Primary Examiner—Robert J. Corcoran
Attorney, Agent, or Firm—Pennie & Edmonds

[57] ABSTRACT

Time adjustable pairs of gate pulses for gating phase-sensitive detectors in pulse eddy current testing apparatus are produced by a ramp generator responsive to pulses corresponding to the driving pulses applied to the test coil assembly, an adjustable level control circuit for changing the DC level of the ramps, a pair of electronic switching circuits which switch at different instantaneous values of the ramps, and means responsive to the switching for producing pairs of gate pulses. The pairs of gate pulses may be quadrature-related and their time occurrence shifted with respect to the driving pulses by changing the ramp level. An adjustable clamping circuit for level control, a pair of switching amplifiers, and differentiating the outputs of the switching amplifiers to produce the gate pulses are specifically described.

9 Claims, 3 Drawing Figures

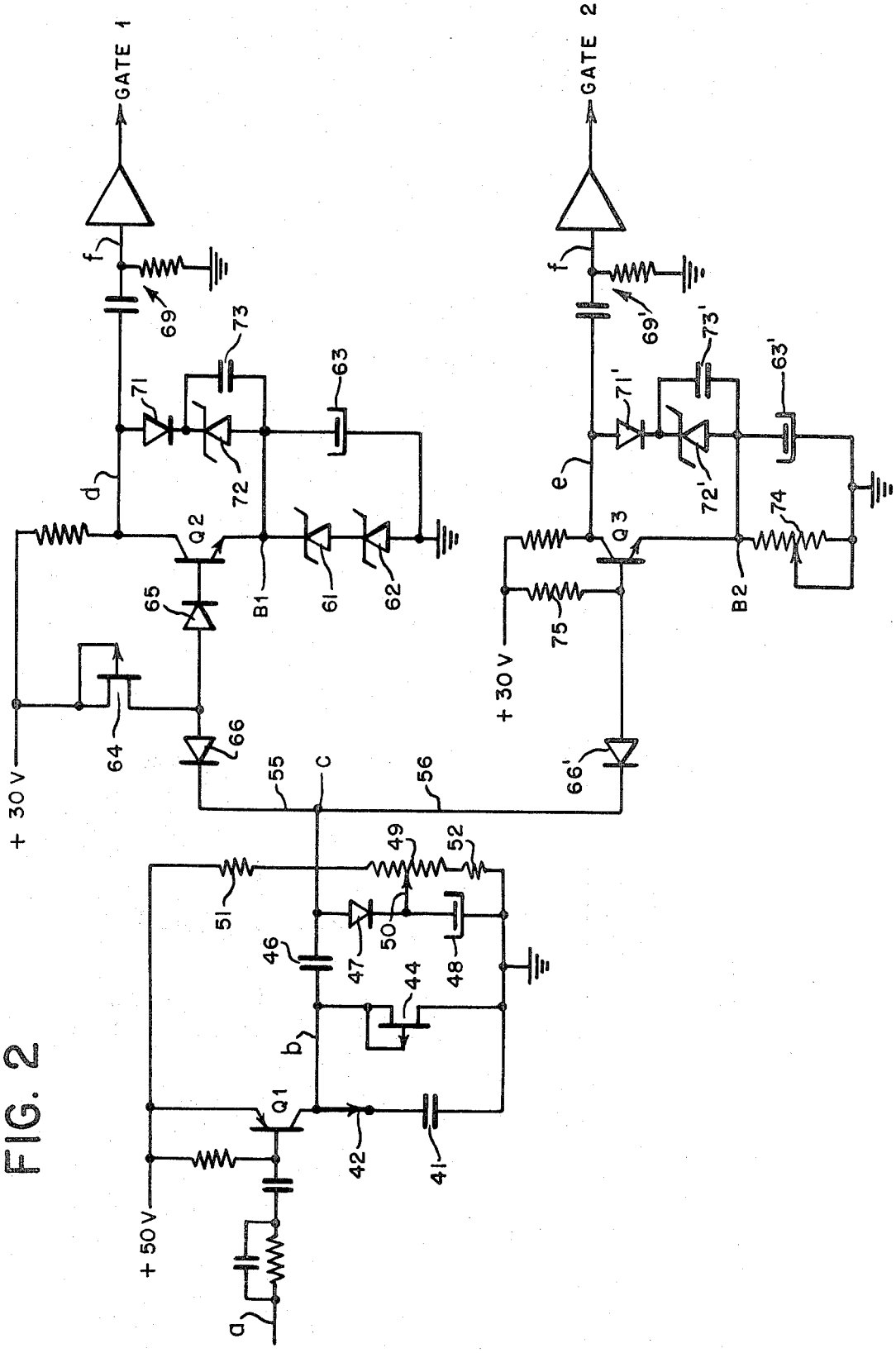

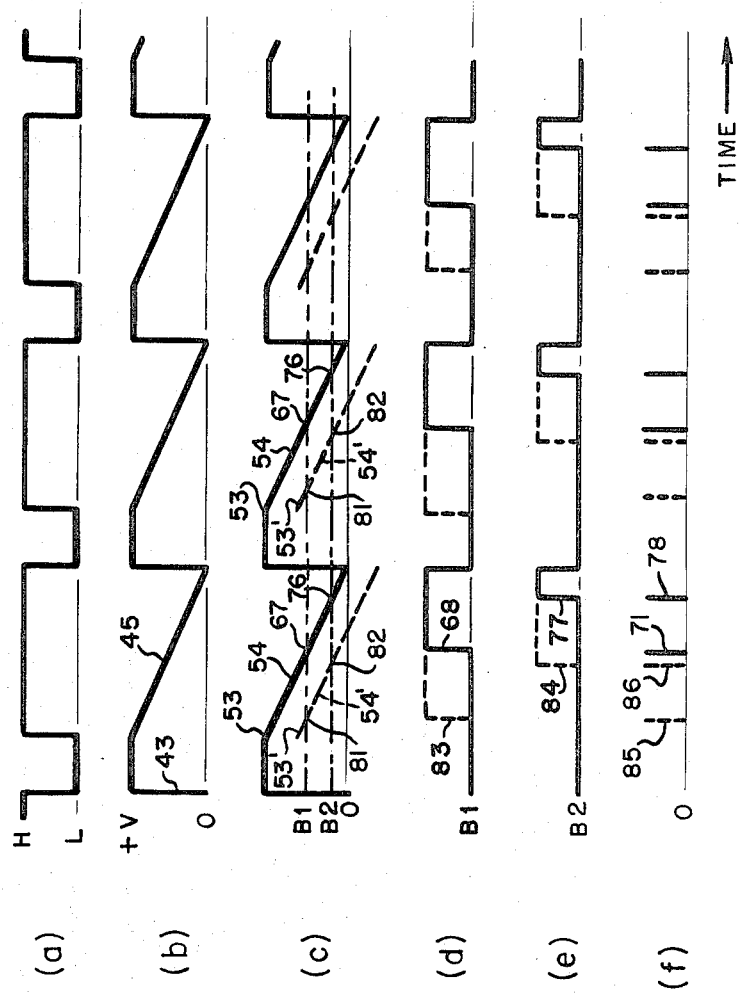

PULSE EDDY CURRENT TESTING APPARATUS WITH RAMP PHASE SHIFTER

BACKGROUND OF THE INVENTION

Eddy current testing apparatus is well-known, and is particularly useful in the non-destructive testing of conductive objects to determine defects or flaws therein. In such apparatus a test coil assembly is energized to induce eddy currents in an object under test, and responds to changes in the eddy current flow to produce output signals varying with defects or flaws in the object.

In one type of apparatus objects of uniform cross-section such as bars, tubes, wires, etc. are continuously passed through a primary coil in the coil assembly, and a pair of secondary coils connected in series opposition produce a null output when the eddy current field is uniform. Then, any discontinuities in the object which alter the eddy current magnitude or distribution will produce output flaw signals which are detected and indicated in a desired manner. Instead of having the object pass through the coil assembly, the assembly may be arranged as a probe which is moved relative to the surface of the object under test.

Another type of eddy current test apparatus operates as a comparator, that is, an object is placed in one set of coils and the resultant signal compared with that of a reference object place in another set of coils. Here also, the secondary coils are commonly connected in opposition to produce a null signal when the objects are alike, and an output signal when they are unlike.

Frequently the test coil assembly is energized with alternating current and the output signal, modulated in amplitude or phase, or both, by defects or flaws is supplied to a pair of phase-sensitive detectors which are gated to produce quadrature signal components which are processed and supplied to a cathode ray oscilloscope to produce a polar coordinate display of the signal amplitude and phase. One or the other of these quadrature components may be supplied to indicator apparatus such as a chart recorder or alarm system.

Pulse excitation of a test coil assembly is also known in which DC pulses are applied to the test coil assembly. In some cases the resultant signal is displayed or otherwise indicated to yield information concerning an object under test. In others the output signal is sampled or grated. Thus a sliding sampling pulse produced with the aid of a delay line has been suggested. Also, in my application Ser. No. 317,140 filed Dec. 21, 1972, fixed quadrature-related gate pulses are disclosed. That application also discloses means for generating stable pulses in which the duration, amplitude and pulse repetition frequency (PRF) are closely controlled, while allowing the PRF to be selected as desired.

Although fixed quadrature-related gate pulses frequently suffice, it is sometimes desirable to use gates whose time occurrence with respect to the driving pulses can be varied. Such gate pulses should be free of jitter. Also, if pair of gate pulses are employed which are quadrature-related or otherwise fixed in time with respect to each other, it is desirable to be able to adjust the time occurrence of the pairs with respect to the driving pulses while preserving the desired relationship between the pulses of a pair.

The present invention is particularly directed to the provision of apparatus for providing pairs of pulses of uniform separation which are time adjustable with respect to the driving pulses and which can conveniently be adapted for use at different PRF's. If desired, however, the apparatus can be used to produce a single series of time-adjustable gate pulses.

SUMMARY OF THE INVENTION

In accordance with the invention a ramp generator is supplied with pulses corresponding to the driving pulses supplied to the test coil means or assembly, and produces respective ramps following respective pulses. The ramps are supplied to a level control circuit which is adjustable to change the DC level of the ramps. Advantageously the level control circuit comprises a clamping circuit having an adjustable clamping level, and the ramps are supplied thereto through an AC coupling so that the initial portions of the ramps are clamped to the adjustable clamping level.

The resulting ramps are supplied to an electronic switching circuit to switch the output state thereof at a predetermined instantaneous value of successive ramps, and means responsive to the switching produces respective gate pulses. These gate pulses are then supplied to phase-sensitive detector means in the eddy current testing apparatus. By adjusting the level control circuit, the time occurrence of the gate pulses with respect to the pulses applied to the test coil assembly may be changed, and thus the phase of the gating with respect to the output signal from the test coil assembly may be shifted.

It is particularly contemplated to employ a pair of electronic switching circuits supplied with the ramps from the level control circuit, and designed to switch at different instantaneous values of the ramps so as to produce respective pairs of gate pulses spaced in time between the pulses applied to the test coil assembly. In this manner quadrature-related gate pulses may be produced after each driving pulse or, if desired, pairs of gate pulses having other specific time separations. Then, by adjusting the ramp level control circuit, the pairs of pulses may be shifted with respect to the driving pulses, while maintaining the desired relationship between the pulses of a pair. Accordingly the phase of the gating with respect to the signal from the test coil assembly may be shifted without changing the relative phase of the gating.

It is preferred to employ switching amplifiers for the electronic switching circuits, and to differentiate the outputs thereof to produce the gate pulses.

The gate generator is capable of operating over a wide range of PRF's with only simple component switching which can readily be actuated along with other switching employed to change the PRF.

Other features of the invention will be pointed out in the following description of a specific embodiment thereof, or will be understood by those skilled in the art.

BRIEF DESCRIPTION OF THE DRAWINGS

FIG. 2 is a circuit diagram of a gate generator in accordance with the invention; and FIG. 3 shows waveforms for FIG. 2.

DESCRIPTION OF THE SPECIFIC EMBODIMENTS

Figure 1:
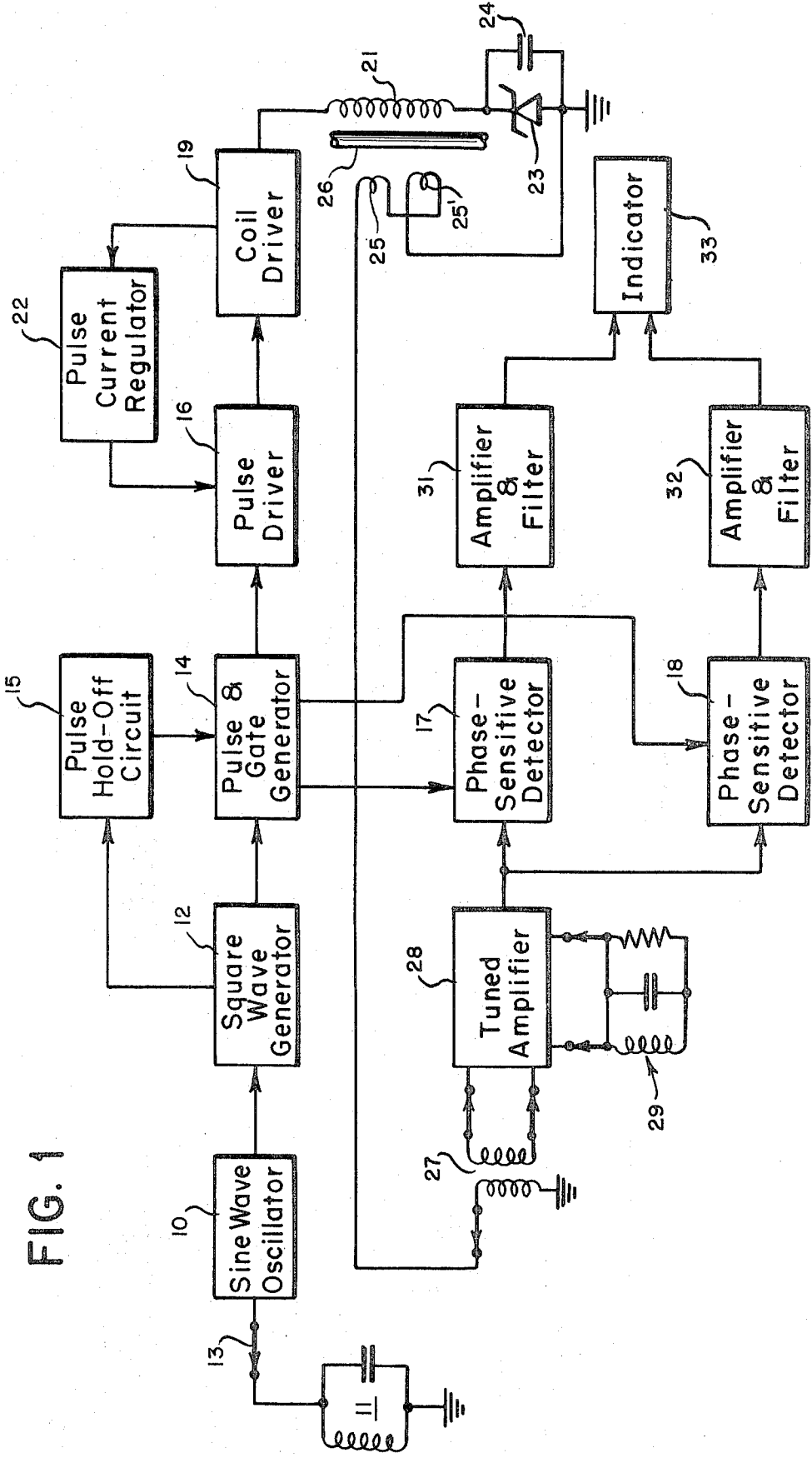
FIG. 1 is a block diagram of a pulse eddy current flaw detector in which the invention may be employed.

Referring to FIG. 1, a sine wave oscillator 10 including a tank circuit 11 supplies a sine wave to a square wave generator 12. Different tank circuits may be connected to oscillator 10 through switch 13 so that the frequency of the sine wave can be selected as desired. Outputs of the square wave generator are supplied to a pulse and gate generator 14 and to a pulse hold-off circuit 15.

The pulse hold-off circuit functions to alternatively allow and prevent the production of output pulses by the pulse generator in 14, so that the output pulses correspond to regularly recurring non-sequential excursions of one polarity of the square wave supplied to the pulse generator. Accordingly output pulses are supplied to pulse driver 16 of desired duty cycle in which the pulses are precisely related in time occurrence and duration to the half-cycles in the input square wave which are not eliminated by the hold-off circuit. Thus, if alternate excursions of one polarity of the input square wave are eliminated, outout pulses of 25 percent duty cycle and a PRF (pulse recurrence frequency) half the frequency of the input square wave, and hence half the frequency of the initial sine wave, may be produced.

If less than 25 percent duty cycle is desired, the pulse hold-off circuit may be modified to eliminate the effect of one or more trigger pulses following reset by an output pulse before the circuit enables the pulse generator to pass the next excursion of the square wave.

Generator 14 also produces quadrature gating pulses which are supplied to phase-sensitive detectors 17, 18. The generator to which the present invention is directed will be described below in connection with FIGS. 2 and 3.

Output pulses from the pulse driver 16 are fed to coil driver 19 and thence to the primary winding 21 of an eddy current flaw detector coil assembly. A pulse current regulator 22 is provided to insure that constant current pulses are applied to the primary coil, and is described and claimed in application Ser. No. 328,889, filed Feb. 1, 1973 by Sven E. Mansson for "CURRENT REGULATOR FOR PULSE EDDY CURRENT TESTER." A Zener diode 23 and shunt capacitor 24 provides a discharge path to release the energy stored in primary 21 at the end of a driving pulse, and is also described in the aforesaid application.

Two secondary coils 25, 25' are connected in series opposition to form a null coil arrangement which yields little or not output in the absence of a flaw or other irregularity in the object 26 fed therethrough, but yields an output varying in amplitude and/or phase in the presence of a flaw or other irregularity. The output of the null coils is supplied through a switchable transformer 27 to a tuned amplifier 28 which includes a switchable tuned circuit 29. Different transformers and tuned circuits may be switched into operation along with the switching of the oscillator tank circuit 11.

With driving pulses of 25 percent duty cycle applied to primary coil 21, there will be a strong frequency component at the PRF of the pulses in the secondary coils in the presence of flaws, etc. It is preferred to tune the amplifier 28 to the PRF of the driving pulses so as to obtain a maximum signal response to flaws, etc. Also, the tuning serves to reduce noise and undesired frequency components which may exist in the output of null coils 25, 25'. The bandwidth of the tuned amplifier should be sufficient to encompass side-bands resulting from flaws, etc.

With a 25 percent duty cycle the duration of a pulse is one-quarter wavelength when the amplifier is tuned to the PRF, and this has been found desirable for high efficiency. This corresponds to tuning to one-half the initial sine wave frequency. However, tuning to the second or perhaps higher harmonics of the PRF may be desirable in some cases, so that in general it is desirable to tune the amplifier to a multiple of the PRF, or a multiple of one-half the sine wave frequency, the term multiple being understood to include 1.

For duty cycles less than 25 percent, tuning to a frequency such that the pulse width is one-quarter wavelgnth is desirable to obtain good signal response. Inasmuch as the pulse width will still be one-half cycle of the initial sine wave, this corresponds to tuning to one-half the sine wave frequency.

The output of the tuned amplifier 28 is supplied to the phase-sensitive detectors 17, 18, along with the quadrature gates from generator 14, to produce quadrature signal components. These are fed to respective amplifiers and filters 31, 32 and then to an indicator 33 such as a cathode-ray tube, in accordance with known practice.

The above arrangement and specific circuits for generating the pulses are described in the aforesaid application Ser. No. 317,140. It will be understood that the present invention is not limited to the specific arrangement shown, and may be employed in other types of pulse eddy current testing apparatus and with other means for generating pulses having the desired width and time occurrence.

Referring to FIGS. 2 and 3, a gate generator is shown for developing quadrature related gate pulses whose time occurrence with respect to the test coil driving pulses can be adjusted as desired. Letters a–f in FIG. 2 refer to corresponding waveforms in FIG, 3. Both PNP and NPN type transistors are specifically shown, as well as the FET type (field-effect transistor), but it will be understood that the types can be selected as desired, with appropriate changes of voltages, etc., if required, as will be understood by those skilled in the art.

Input pulses a are applied through a coupling circuit to transistor Q1, here of the PNP type. The pulses are produced in generator 14 (FIG. 1) and have the samme duration and time occurrence as the drive pulses applied to primary 21 of the test coil assembly. As specifically shown in FIG. 3a, the pulses are negative going from high (H) to low (L) voltage levels. Transistor Q1 is normally off (non-conducting) and is turned on (conducting) during the pulse occurrences.

Capacitor 41 is part of the ramp generator and is rapidly charged to substantially the power supply voltage when Q1 is turned on. Different capacitors may be used for different PRF's, and placed in circuit by switch 42 which may be actuated along with the switches shown in FIG. 1. At lower PRF's the capacitor can be charged very quickly, as shown at 43 in FIG. 3b. At higher PRF's the rise may be less abrupt, but should reach the power supply voltage before the end of an applied pulse.

At the end of an applied pulse, capacitor 41 is discharged through a constant current device, here shown as a constant-current connected FET 44. Thus a ramp 45 having a linear slope is produced. The slope of the ramp can be controlled by the discharge rate, and it is here assumed that the capacitor is substantially completely discharged at the time of arrival of the next pulse.

The ramp output of Q1 is AC coupled through capacitor 46 to an adjustable level control circuit which enables the DC level of the ramp to be changed. As here shown, a clamping circuit comprising diode 47, a large storage capacitor 48 and potentiometer 49 are employed. The potentiometer is connected from the power supply voltage to ground, and resistors 51, 52 may be used to limit the range of control. The setting of slider 50 determines the voltage at which diode 47 conducts, thereby clamping the initial portions of the ramps to a desired voltage as shown at 53, 53' in FIG. 3c.

In FIG. 3c the full line waveform represents the output of the level-control circuit for a near maximum phase shift with respect to the applied pulses, the ramps being designated 54. The dotted ramps 54' represent a near minimum phase shift, and only the ramp portions are shown to avoid confusing the drawing.

The ramps from the level control circuit are supplied through lines 55, 56 to a pair of electronic switching circuits which change their output states at different instantaneous values of the ramps supplied thereto. As specifically shown, switching amplifiers including NPN transistors Q2 and Q3 are employed.

Considering the upper switching circuit, the emitter of Q2 is fixed biased at a desired level by Zener diodes 61, potentiometer shunted by a large capacitor 63. For example, in the specific circuit shown a +15 volt bias may be employed. A constant current FET 64 and diode 65 forward biases Q2 so that it is normally conducting. The initial high ramp voltage in line 55 back biases diode 66 so that it is non-conducting and Q2 remains on. However, when the ramp voltage falls below the emitter bias, diode 66 will conduct, diode 65 will cease to conduct, and Q2 will be cut off. In FIG. 3c, line B1 indicates the emitter bias of Q2, and when the ramp 54 goes below the bias level at point 67, Q2 ceases to conduct and its collector output voltage will rise rapidly as shown at 68 in FIG. 3d. For simplicity, diode threshold voltages are disregarded in this explanation. Q2 will continue to be cut off until the ramp voltage rises rapidly at the beginning of the next driving pulse in FIG. 3a, whereupon it will be turned on and the output voltage fall to its initial value of approximately B1.

The output of Q2 is supplied to a C-R differentiating circuit 69, thereby producing an early gate pulse 71 in FIG. 3f, corresponding to the leading edge 68. To insure a sharp leading edge 68 for precise differentiation, the output voltage of Q2 in its off condition is limited by diode 71 and Zener diode 72 shunted by capacitor 73.

The lower Q3 switching circuit is similar to that of Q2, except that an adjustable emitter bias is supplied by otentiometer 74 connected as a variable resistor, and resistor 75 supplies forward bias. The Q3 emitter is biased at a lower level than Q2, as indicated by B2 in FIG. 3c and FIG. 3e. Thus Q3 is cut off at a lower ramp voltage as indicated at point 76, yielding an output pulse whose leading edge 77 is differentiated to form a late gate pulse 78.

By adjusting the bias of Q3 with potentiometer 74, the time occurrence of pulse 78 relative to pulse 71 can be set as desired. For quadrature gating the time separation may be set with respect to the tuning of amplifier 28 (FIG. 1) so that the pulses are quarter-wavelength apart at the tuned frequency.

To shift the phase of the pulse pairs 71, 78 with respect to the driving pulses in FIG. 3a, and hence with respect to the defect or flaw signal from coils 25, 25' passing through amplifier 28 in FIG. 1, it is only necessary to change the clamping level established by slider 50 in the level control circuit. A lower clamping level lowers the DC level of the ramps, as illustrated at 54' in FIG. 3c. With biases B1 and B2 unchanged, Q2 will switch at point 81 and Q3 will switch at point 82. The respective outputs will go high at 83 and 84, thereby producing differentiated gate pulses 85, 86 which have the same separation as gate pulses 71, 78 but occur earlier.

It may be mentioned that when Q2 is switched off to produce an early gate pulse such as 71 or 85, the load on the ramp circuit may change somewhat so that ramp slope is slightly changed as Q2 is switched off. This may be taken into account in the initial adjustment of potentiometer 74. It is found that the constant current forward bias device 64 for Q2 is useful to maintain the slight change in ramp slope constant as the ramp level is changed, so that the separation of the pulses of a pair remains unchanged. However, in some cases a resistor may suffice. Resistor 75 for forward biasing Q3 has been found sufficient, since any change in ramp slope after the late gate is produced is unimportant. Indeed, in practice it has been found that as the ramp is lowered, such as at 54' in FIG. 3c, the latter portion of the ramp may level off rather than continue to fall. This is unimportant since gage pulses 85, 86 have already been developed.

With quadrature-related gate pulses and a 25 percent duty cycle of the initial driving pulses, as illustrated in FIG. 3, the pulse pairs may be shifted over substantially 180° with respect to the fundamental frequency of the driving pulses (equal to the PRF). If a greater phase shift is desired, the outputs from the phase-sensitive detectors 17, 18 to indicator 33 in FIG. 1 may be interchanged by suitable switching so that an addtional phase shift is obtainable.

Various changes in the specific embodiment of FIG. 2 may be made to suit the requirements of a particular application. Thus either bias of the switching amplifiers Q2 and Q3 may be made adjustable and the other fixed, or both could be made adjustable. With appropriate voltage relationships one bias could be at ground level. In place of the simple differentiating circuits shown, more elaborate circuits such as those using Schmitt type trigger circuits, etc. could be employed.

In applications where a single sliding gate pulse suffices, one of the switching circuits of FIG. 2 may be eliminated.

I claim:

1. In a pulse eddy current testing apparatus including a pulse generator, test coil means supplied with pulses from said generator for inducing eddy currents in an object under test and producing output signals varying with defects or flaws in the object, phase-sensitive detector means supplied with output signals from said test coil means, and means for utilizing signals from the phase-sensitive detector means to produce indications of said defects or flaws; means for producing time adjustable gate pulses for said phase-sensitive detector means which comprises a. a ramp generator responsive to pulses from said pulse generator for producing respective ramps following respective pulses,
b. an adjustable level control circuit supplied with said ramps for changing the DC level thereof,
c. an electronic switching circuit supplied with ramps from said adjustable level control circuit for switching the output state thereof at a predetermined instantaneous value of successive ramps supplied thereto,
d. and means responsive to said switching for producing respective gate pulses,
e. said gate means being supplied to said phase-sensitive detector means.

2. Apparatus according to claim 1 in which said adjustable level control circuit includes a clamping circuit having an adjustable clamping level, and AC coupling means for supplying ramps from said ramp generator to said clamping circuit to clamp the initial portions of the ramps to said adjustable clamping level.

3. Apparatus according to claim 1 in which said electronic switching circuit is a switching amplifier biased to switch the output state thereof at said instantaneous value of the ramps supplied thereto and produce a series of output pulses, and said means responsive to the switching is responsive to the leading edges of the series of output pulses to produce a corresponding series of gate pulses.

4. Apparatus according to claim 3 including limiting means for limiting the output of said switching amplifier to a predetermined magnitude.

5. In pulse eddy current testing apparatus including a pulse generator, test coil means supplied with pulses from said generator for inducing eddy currents in an object under test and producing output signals varying with defects or flaws in the object, a pair of phase-sensitive detectors supplied with output signals from said test coil means, and means for utilizing signals from the phase-sensitive detectors to produce indications of said defects or flaws; means for producing time adjustable pairs of gate pulses for said phase-sensitive detectors which comprises
a. a ramp generator responsive to pulses from said pulse generator for producing respective ramps following respective pulses,
b. an adjustable level control circuit supplied with said ramps for changing the DC level thereof,
c. a pair of electronic switching circuits supplied with ramps from said adjustable level control circuit for switching the output stage thereof at different instantaneous values of the ramps supplied thereto,
d. and respective means responsive to the switching of said pair of switching circuits for producing pairs of gate pulses spaced in time between the pulses from said pulse generator,
e. said pairs of gate pulses being supplied to said pair of phase-sensitive detectors respectively.

6. Apparatus according to claim 5 in which said adjustable level control circuit includes a clamping circuit having an adjustable clamping level, and AC coupling means for supplying ramps from said ramp generator to said clamping circuit to clamp the initial portions of the ramps to said adjustable clamping level.

7. In pulse eddy current testing apparatus including a pulse generator, test coil means supplied with pulses from said generator for inducing eddy currents in an object under test and producing output signals varying with defects or flaws in the object, a pair of phase-sensitive detectors supplied with output signals from said test coil means, and means for utilizing signals from the phase-sensitive detectors to produce indications of said defects or flaws; means for producing time adjustable pairs of gate pulses for said phase-sensitive detectors which comprises
a. a ramp generator responsive to pulses from said pulse generator for producing respective ramps following respective pulses,
b. a clamping circuit having an adjustable clamping level,
c. AC coupling means for supplying said ramps to said clamping circuit to clamp the initial portions of the ramps to said adjustable clamping level,
d. a pair of switching amplifiers supplied with ramps from said clamping circuit,
e. means for biasing said switching amplifiers to switch the output states thereof at different instantaneous values of the ramps supplied thereto and produce pairs of output pulses initiated at different instants during respective ramps,
f. and respective means responsive to the leading edges of the output pulses from said switching amplifiers for producing pairs of gate pulses spaced in time between the pulses from said pulse generator,
g. said pairs of gate pulses being supplied to said pair of phase-sensitive detectors respectively.

8. Apparatus according to claim 7 in which the means for biasing at least one of said switching amplifiers is adjustable.

9. Apparatus according to claim 7 including limiting means in the output circuit of each of said switching amplifiers for limiting the outputs thereof to predetermined magnitudes.

* * * * *

UNITED STATES PATENT OFFICE
CERTIFICATE OF CORRECTION

Patent No. 3,798,538　　　　　　　　Dated　March 19, 1974

Inventor(s) SVEN E. MANSSON

It is certified that error appears in the above-identified patent and that said Letters Patent are hereby corrected as shown below:

Col. 1, line 48, for "grated" read -- gated -- .

Col. 3, line 48, for "not" read -- no -- .

Col. 5, line 29, for "61, potentiometer" read -- 61, 62 -- .

Col. 6, line 1, after "are" insert -- a -- .

, line 18, after "that" insert -- the -- .

, line 33, for "gage" read -- gate -- .

, line 57, delete "a".

Col. 7, line 50, for "stage" read -- states -- .

Signed and sealed this 30th day of July 1974.

(SEAL)
Attest:

McCOY M. GIBSON, JR.　　　　　　　C. MARSHALL DANN
Attesting Officer　　　　　　　　Commissioner of Patents